US006048031A

United States Patent [19]

Warhaftig

[11] Patent Number: 6,048,031

[45] Date of Patent: Apr. 11, 2000

[54] RECLINING BACKREST SYSTEM AND KIT FOR A PERSON IN A WHEELCHAIR

[75] Inventor: Stephen Warhaftig, Scarsdale, N.Y.

[73] Assignee: Skil-Care Corp., Yonkers, N.Y.

[21] Appl. No.: 09/239,350

[22] Filed: Jan. 28, 1999

Related U.S. Application Data

[63] Continuation of application No. 08/246,167, May 19, 1994, Pat. No. 5,865,504.

[51] Int. Cl.$^7$ .................................................. B60N 2/22

[52] U.S. Cl. ................................ 297/354.12; 297/354.1; 297/DIG. 4

[58] Field of Search ............................ 297/354.12, 354.1, 297/354.11, DIG. 4

[56] References Cited

U.S. PATENT DOCUMENTS

| | | | |
|---|---|---|---|
| 579,337 | 3/1897 | Boniface . | |
| 751,448 | 2/1904 | Barschow . | |
| 1,544,423 | 6/1925 | Behymer . | |
| 3,005,659 | 10/1961 | Sanders . | |
| 3,419,309 | 12/1968 | Smith . | |
| 3,746,392 | 7/1973 | German . | |
| 3,881,773 | 5/1975 | Rodaway | 297/DIG. 4 X |
| 5,127,709 | 7/1992 | Rubinstein et al. | 297/DIG. 4 X |
| 5,195,803 | 3/1993 | Quintile | 297/DIG. 4 X |
| 5,263,768 | 11/1993 | Scheulderman | 297/354.12 X |
| 5,294,141 | 3/1994 | Mentessi et al. | 297/354.12 X |
| 5,297,821 | 3/1994 | Koerlin et al. | 297/354.12 X |
| 5,333,887 | 8/1994 | Luther | 297/DIG. 4 X |
| 5,445,433 | 8/1995 | Avihod | 297/DIG. 4 X |
| 5,524,971 | 6/1996 | Jay et al. | 297/354.12 X |
| 5,551,756 | 9/1996 | Gurasich et al. | 297/354.12 X |
| 5,556,157 | 9/1996 | Wempe | 297/DIG. 4 X |
| 5,556,168 | 9/1996 | Dinsmeer, II et al. | 297/DIG. 4 X |
| 5,593,211 | 1/1997 | Jay et al. | 297/354.12 X |
| 5,848,824 | 12/1998 | Mocur | 297/DIG. 4 X |
| 5,865,504 | 2/1999 | Warhaftig | 297/354.12 |

*Primary Examiner*—Peter M. Cuomo
*Assistant Examiner*—Rodney B. White
*Attorney, Agent, or Firm*—Stephen A. Roen

[57] ABSTRACT

A reclining backrest system for a person in a wheelchair having a seat and a wheelchair frame which includes a pair of substantially vertical members, comprising a backrest, brace members and a cushion. The backrest is substantially rigid and has longitudinal and lateral edges. The lateral edges include a lower edge. The brace members have a certain amount of flexibility and are affixed to the lower edges of the backrest to the pair of vertical frame members.

An improved reclining backrest system comprises a hinge mechanism and a lengthened backrest, the hinge mechanism affixed to the frame, below the seat, and the backrest.

17 Claims, 12 Drawing Sheets

FIG.3
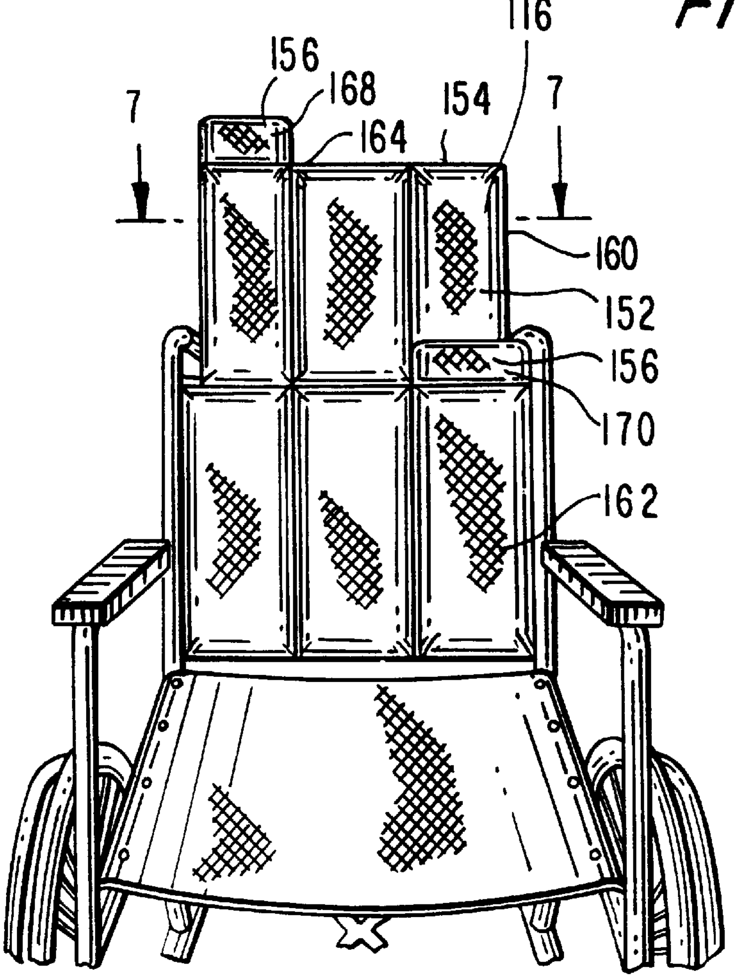
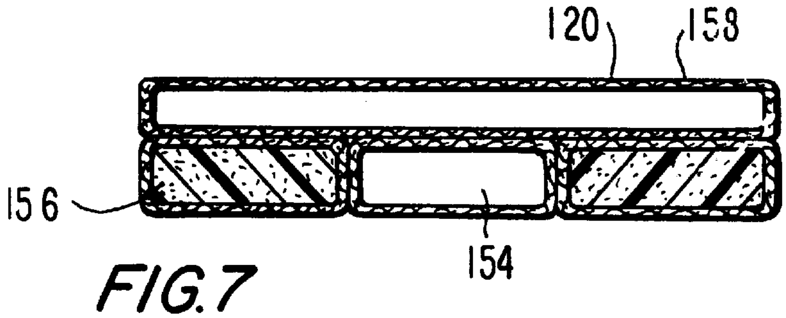
FIG.7
FIG.9
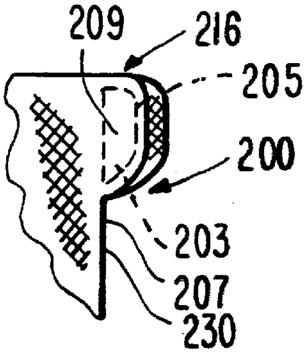

RECLINING BACKREST SYSTEM AND KIT FOR A PERSON IN A WHEELCHAIR

This Application is a continuation/continuation-in-part of application Ser. No. 08/246,167, filed on May 19, 1994 entitled "A Reclining Backrest System For a Person In A Wheelchair" now (U.S. Pat. No. 5,865,504).

FIELD OF INVENTION

This invention relates to a reclining system for a person in a wheelchair. More particularly, this invention relates to a reclining backrest system which includes a rigid backrest and a brace member which is affixed to the lower edges of the backrest and the wheelchair's vertical frame members. This system also comprises a cushion supported by the front portion of the backrest. The cushion has a plurality of longitudinally extending pockets and a plurality of removable pads adapted for insertion within the pockets.

The other embodiment of this invention relates to a reclining backrest system which includes a rigid backrest and a hinge mechanism which is affixed to the lower edges of the backrest and the wheelchair's vertical frame members. This system also can include a cushion supported by the front portion of the backrest. The cushion has a plurality of longitudinally extending pockets and a plurality of removable pads adapted for insertion within the pockets.

DESCRIPTION OF THE PRIOR ART

There are numerous wheelchair seating systems and chairs that have reclining backs.

A wheelchair seating system is disclosed by Jay et al in U.S. Pat. No. 5,407,248. It includes a mounting mechanism 50 which is an integral part of wings 38. Such mechanism 50 provides flexibility to the wheelchair since it permits adjustment of height "H", reclining angle "A" and depth "D" for its shell 36. Such mounting mechanism 50 as compared to the present invention is relatively complex.

Another wheelchair seating system, is disclosed by Morrison et al in U.S. Pat. No. 5,088,747. A vertical back cushion is utilized, which has a removable member providing hard or firm as well as cushioned seat back characteristics.

The back cushion of the seating system generally includes a rectangular member having a cushion portion and a flap portion. The cushion portion includes a foam pad insert covered by a fabric material outer covering.

The cushion portion may include stitching lines providing a pleasing aesthetic effect. The underside of the cushion portion includes a pair of strips of either hook or loop fasteners on a vertical sling of the wheelchair. Also a hook or loop fastener is positioned along the lateral bottom edge of the cushion portion for mating with a hook or loop fastener on the bottom of the sling to close off the back and prevent objects from falling out of the wheelchair.

The flap portion is generally formed continuously with a fabric covering including a material pocket. The under side of the fabric flap includes hook or loop fasteners on the back of the wheelchair back sling. Therefore, the flap portion is secured to the back of the wheelchair vertical sling or the vertical support to retain the flap in position.

At the junction of the cushion portion and flap portion, a zipper or the like is positioned to enable access into a support member pocket. The support member pocket includes a support member. The support member is a rectangular board-like member having a width less than the width of the vertical back sling.

The support member may be moved in position from in front of the back sling to behind the back sling. When the support member is in front of the back sling, it provides hard back support surface characteristics. When the support member is moved to behind the back sling, and the hard back support is removed, the support member pocket becomes a storage pocket.

A sling may be substituted on existing wheelchairs or may be installed as original equipment. The sling back may be adjusted for tension or slack between the support members like the sling seat as explained above. The sling back includes a rectangular sheet of material having a plurality of long narrow pockets at one end of the sling back and a single pocket at the other end. The plurality of pockets enables a narrow strip, metallic or plastic, to be removable positioned in them. These pockets, as well as the narrow strip, have a plurality of apertures to enable the fasteners to pass there through to be secured to the chair supports. The pockets may be positioned upon one another in an accordion type pleat so that the fastener passes through all the apertures in the pockets to provide an aesthetic appearance or the last pocket may just be folded back upon the pocket being used and the material of the suspension sling back may bulge inside of the support. By positioning the narrow strip in different pockets, the tension or slack in the sling may be adjusted. The single pocket includes a strip secured therein and stationary secured to the wheelchair support. Strips of hook or loop fasteners are sewn on the suspension sling back for mating with similar fasteners to position the cushion on the seat sling back.

A go-cart having a reclining backrest, is disclosed by Barschow in U.S. Pat. No. 751,448. Pivoted between its frame is a back. To support the back at different angles, strap-arms are attached to the frame and to the back through a connecting rod, which extends across the rear of the back. The rod is disposed within a cross-strap extending laterally across the rear of the back. Pins or gudgeons, extending through the frame and the lower end of the back, permit the back to pivot.

SUMMARY OF THE INVENTION

The reclining backrest system for a person in a wheelchair having a wheelchair frame which includes a pair of substantially vertical frame members, in its broadest aspect, comprises a backrest and hinge means comprising brace members. In another and second aspect, it comprises a conventional hinge mechanism disposed below the seat. The backrest is substantially rigid and has longitudinal and lateral edges, the lateral edges including a lower edge. Each of the brace members has some flexibility and is affixed to the lower edges of the backrest and to the pair of vertical frame members. All of the hinge mechanisms are affixed to the backrest near its lower edges and to the pair of vertical frame members.

The reclining backrest system for a person in a wheelchair having a wheelchair frame which includes a pair of substantially vertical members, in another broad aspect, comprises a backrest, hinge means and a cushion. The backrest is substantially rigid and has longitudinal and lateral edges, the lateral edges including a lower edge.

The embodiment which utilizes brace members is itself somewhat flexible and is affixed to the lower edges of the backrest and to the pair of vertical frame members. The embodiment which utilizes a hinge mechanism is affixed below the seat near the lower edges of the backrest and to the pair of vertical frame members. The cushion is supported against the front portion of the rigid backrest, and provides a substantially vertical cushioned backrest. The cushion comprises a plurality of longitudinally extending pockets, each pocket having at least one opening, disposed against the front portion of the backrest, and a plurality of removable pads adapted for insertion within the pockets, and provides individual cushioned back surfaces.

An object of both aspects of the present invention is to provide a reclining backrest system which provides upper body control for individuals, particularly those patients in nursing homes, who lean or fall forward and at the same time reduce pressure on the ischial area.

Another object of both aspects of the present invention is to provide a reclining backrest kit which can economically convert any standard wheelchair to a wheelchair with a reclining backrest.

A further object of both aspects of the present invention is to provide a reclining backrest system which is easily installed in any standard wheelchair.

A still further object of the present invention is to provide a reclining backrest system which is completely adjustable and accommodates any degree of tilt required by the user.

An object of the hinge mechanism of the second embodiment of the present invention is to provide a reclining backrest system/kit which provides increased recline angles and more particularly increases the recline angle to thirty degrees and as far as ninety degrees.

Another object of the hinge mechanism of the second embodiment of the present invention is to provide independent mounting for the reclining backrest system/kit, without the necessity of requiring the use of existing holes in the frame members of the wheelchair.

A further object of the hinge mechanism of the second embodiment of the present invention is to provide a mechanically superior hinge mechanism compared to the originally invented brace member embodiment.

A still further object of the hinge mechanism of the second embodiment of the present invention is to provide a reclining backrest system/kit, the height of which can be easily adjusted vertically along the frame members of the wheelchair.

BRIEF DESCRIPTION OF THE DRAWINGS

The above and other objects and advantages and novel features of both embodiments of the present invention will become apparent from the following detailed description of the preferred and alternative embodiments of the invention illustrated in the accompanying drawings, in which:

FIG. 3 is a simplified front view of one embodiment of the reclining system of the present invention of FIG. 1 in place in a wheelchair;

FIG. 7 is a cross-sectional view taken along line 7—7 of FIG. 4;

FIG. 9 is a simplified fragmentary front view of the upper portion of another version of the embodiment of the backrest system shown in FIGS. 1 through 7;

DETAILED DESCRIPTION OF THE INVENTION

Figure 1:
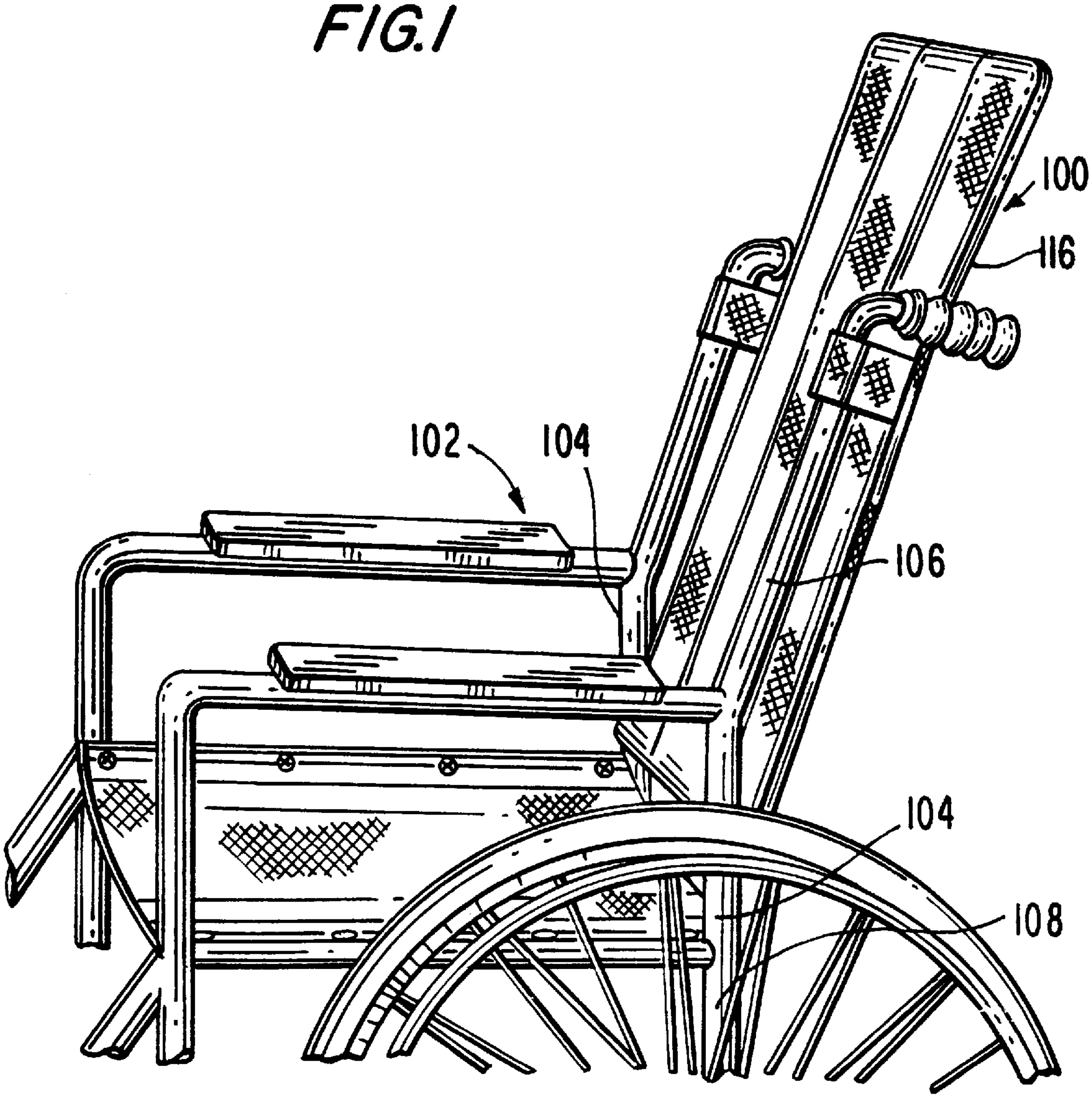
FIG. 1 is a simplified perspective view of one embodiment of the reclining system of the present invention in place in a wheelchair.
Figure 2:
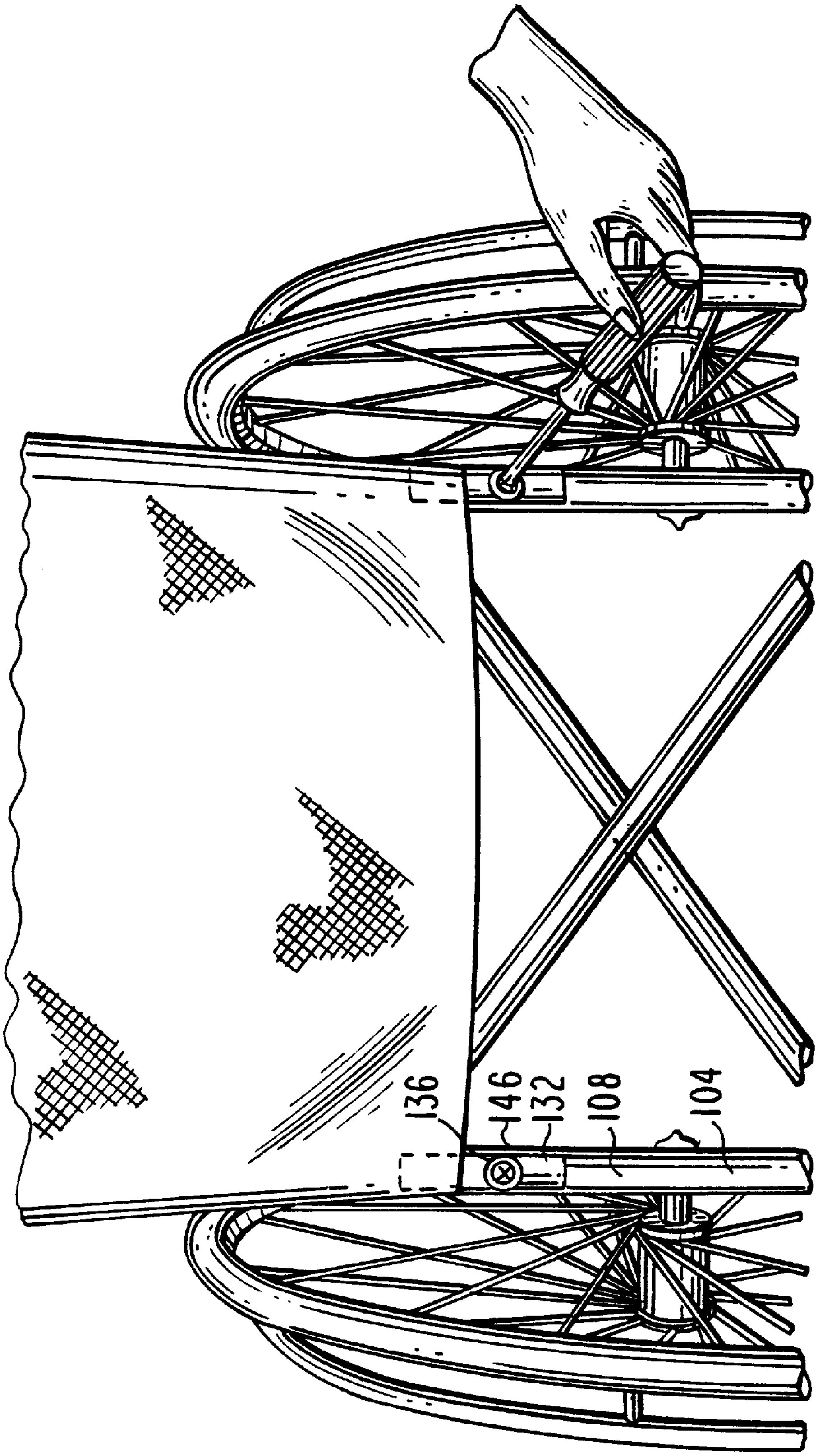
FIG. 2 is a simplified, partial, rear perspective view of the reclining system.
Figure 4:
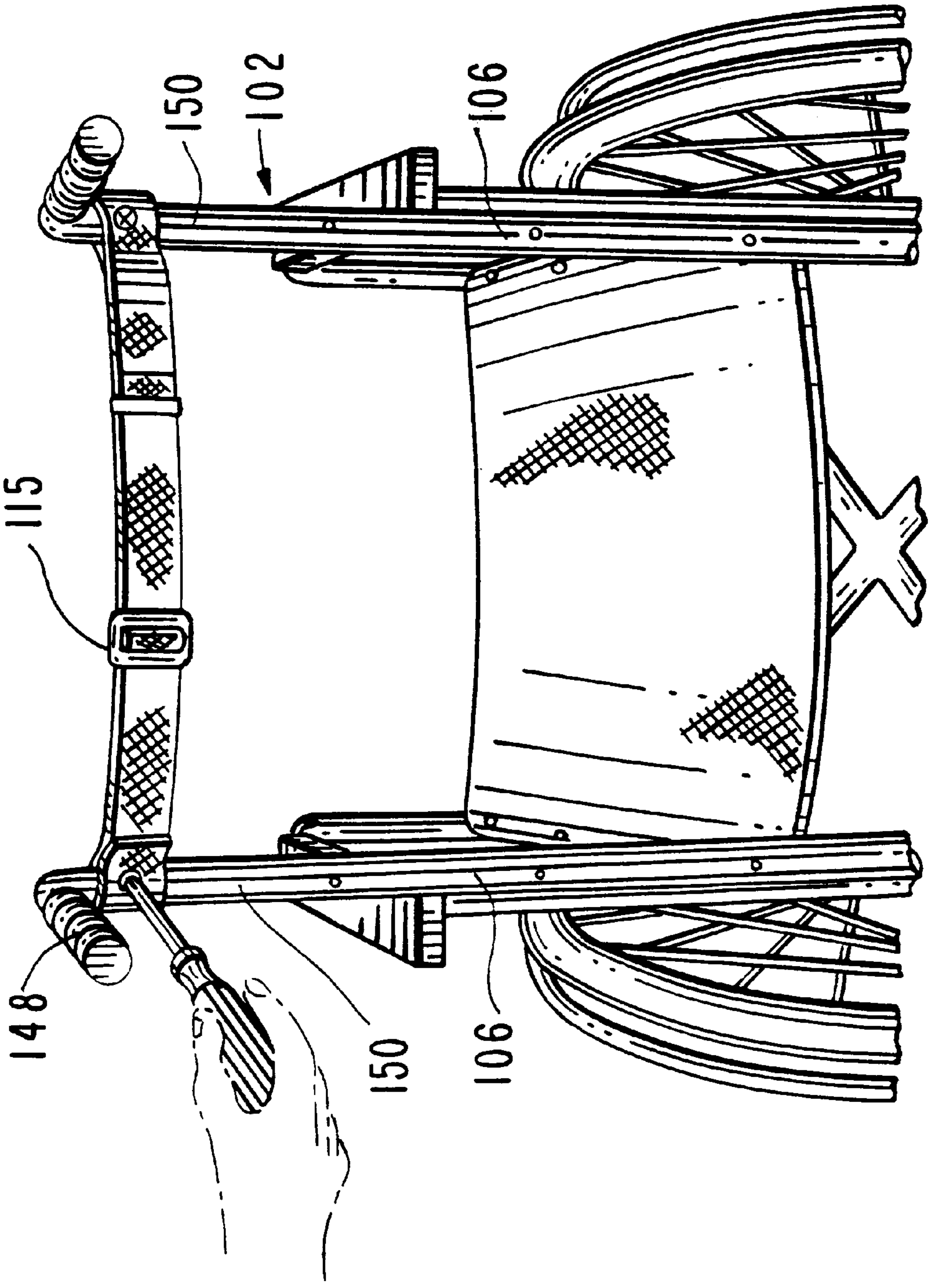
FIG. 4 is a simplified rear view of the support belt portion of the reclining system of FIG. 1.
Figure 5:
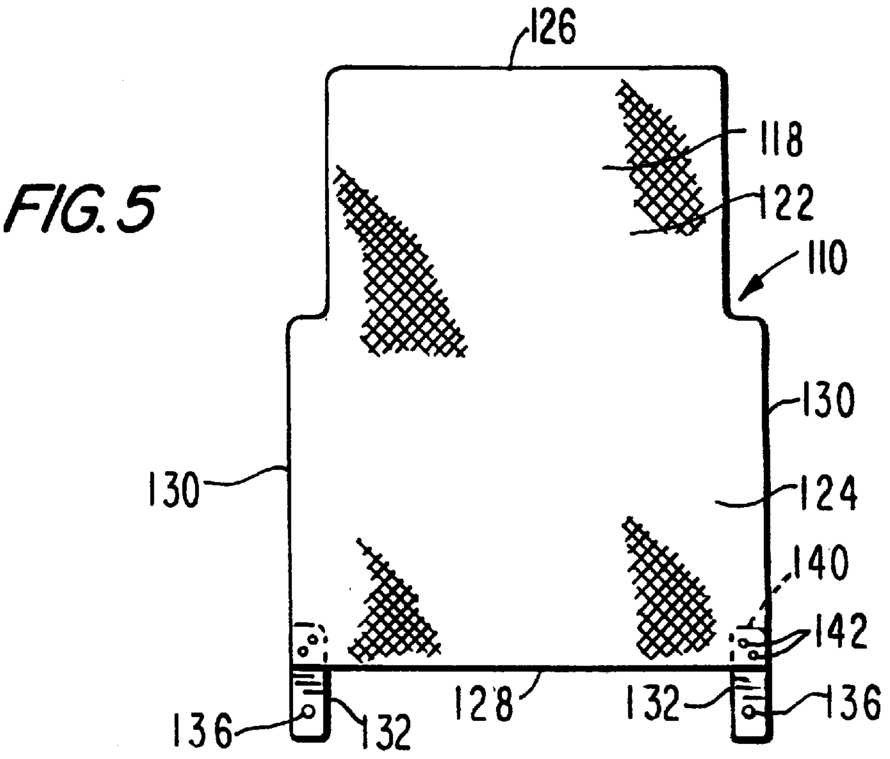
FIG. 5 is a front view of the backrest portion of the reclining system of FIG. 1.
Figure 6:
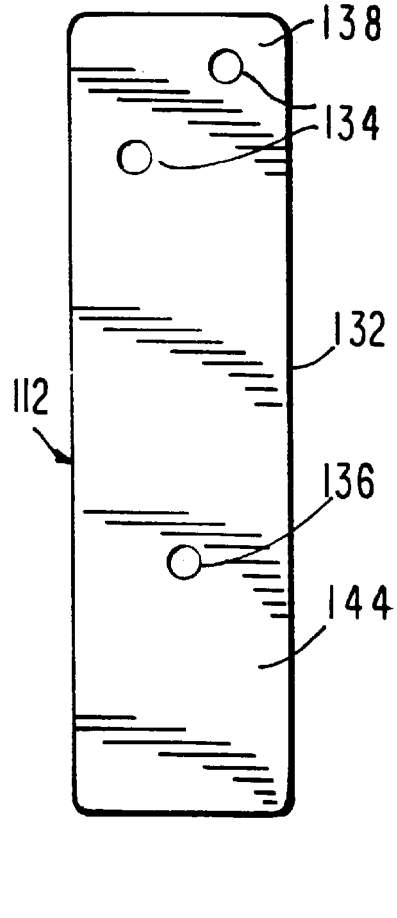
FIG. 6 is a top plan view of a brace member used in the reclining system of FIG. 1.

The reclining system for a person in a wheelchair is generally referred to by reference numeral 100. Referring to FIGS. 1–7, the broadest aspect of the invention is illustrated wherein the wheelchair in which such system is utilized is referred to by reference numeral 102; it comprises a pair of conventional vertical frame members or side frames 104 having upper and lower portions, 106 and 108, respectively and a seat portion 302. This embodiment of the reclining system 100 essentially comprises a substantially rigid backrest or reclining chair back portion 110 (FIG. 5), a flexible brace or hinge means or member 112 (FIG. 6), an adjustable support belt or means 114 having a buckle or working length adjustment means 115 (FIG. 4) and a cushion means 116 for providing a cushioned vertical backrest (FIG. 3). The backrest 110 is generally rectangular shaped and has front and back portions, 118 and 120, respectively. It also has upper and lower portions, 122 and 124, respectively, upper or top, and lower or bottom lateral edges, 126 and 128, respectively, and a pair of longitudinal or side edges 130. The rigid backrest 110 is preferably made of a molded plastic frame and has a front surface 304 aligned to face a patient's back seated in the wheelchair, and a rear surface 306. The chair back portion 110, as best seen in FIG. 7 is curved from its two side edges 130 backwardly away from its front surface 304. The flexible brace means 112 comprises a pair of flat, elongated, brace members 132 (FIG. 6), having a pair of upper apertures 134 and a single lower aperture 136. The brace members 132 are preferably made of spring steel. The upper end 138 of each of the brace member 132 (FIG. 5), is attached to the lower end 140 of the backrest 110 along the longitudinal edge 130 thereof using conventional bolts (not shown) inserted through the apertures 134 at the upper end 138 of the brace member 132 and coincidentally disposed aperture 142 formed in the lower end 140 of the back rest 110 (FIG. 2); conventional nuts (not shown) are used to tighten and hold these elements together. The lower end 144 of each of the brace members 132 is attached to the lower portion 108 of one of the vertical frame members 104; a conventional nut (not shown) is used to tighten and hold these elements together.

The adjustable support belt 114 or chair portion recline adjustment and affixation means (FIG. 4) is disposed below the push handles 148 of the wheelchair 102 and conventionally affixed to each end to the upper end 150 of the upper portions 106 of the vertical frame members 104. The straps 114 support the chair back portion 110 at first sections 308, which straps 114 are detachably engageable with the wheelchair by screws 310, the ends of which are formed into loops which wrap around the side frames 104 by detachably attaching its ends or second sections 312 to one other by a buckle 115 or other conventional means, to select a desired working length of said straps 114. To select the desired degree of incline of the chair back portion 110, the user will adjust the working length of the adjustable straps as measured from the sides 130 of the chair back portion 110 to the points on the side frames 104 of the wheelchair around which the straps 114 wrap or loop.

The cushion means 116 (FIGS. 3 and 7), comprises a plurality of longitudinally extending pockets 152, disposed against the front portion 118 of the backrest 110, a plurality of removable pads 156, preferably made of foam, adapted for being disposed within said pockets 152, and a rear pocket means 158 for securing the plurality of pockets 152 to backrest 110. Each of the pockets 152 have at least one opening 154 therein. The removable pads 156 provide individual, cushioned, back surfaces. The plurality of pockets 152 comprise first and second sets, of longitudinally extending pockets, 160 and 162, disposed, respectively, against the upper and lower portions 122 and 124. Each of the pockets 152 in the first set of pockets 160 have an opening at each end; the same is true of the second set of pockets 162—however the opening at the lower end thereof is only partially open, whereas the other openings are filly open. The rear pocket means 158 is generally rectangular in shape and conforms to the shape of the back rest 110 and extends downward from the upper edge 164 of the cushion means 116 to its lower edge 166. The plurality of removable pads 156 comprise first and second sets of longitudinally extending pads, 168 and 170, adapted for being disposed within, respectively the first and second sets of pockets 160 and 162. The cushion means 116 is preferably made of a vinyl material.

Figure 8:
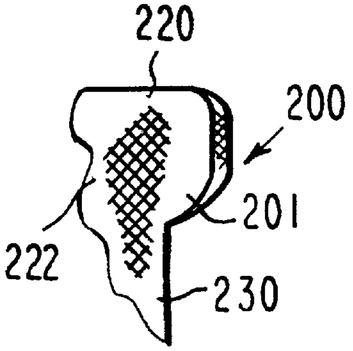
FIG. 8 is a simplified fragmentary view of the upper portion of a version of the embodiment of the backrest shown in FIGS. 1 through 7.

An alternative version of the reclining system is generally referred to by reference number 200, and comprises the same elements of the first embodiment of the system 100, a rigid backrest 220, a flexible brace 112 means, an adjustable support belt and a cushion means 216, except that both the backrest 220 and cushion means 216 include, respectively, a pair of wing portions and wing cushions means, 201 and 203 (FIGS. 8 and 9), and a pair of removable wing pads 209, disposed within said wing cushion means 203. The wing portions 201 (only one of which is shown) extend generally laterally from the longitudinal edges 230 of the upper portion 222 of the backrest 220. The wing cushion means 203 comprise a pair of lateral trunk brace pockets 205 (only one of which is shown), connected to and extending laterally from the upper side edges 207 of the first set of pockets 260. Disposed within the lateral brace pockets 205 are removable wing pads 209 (only one of which is shown in dotted lines) shaped to fit within said pockets 205.

To install the reclining system or kit 100, the existing backrest is removed. Normally this is accomplished by removing several screws which secure the backrest to the upper portion 106 of the vertical frame members 104, thereby revealing the screw holes 146 into which they are to be affixed. Then the adjustable support belt 114 is looped over the push handles 148 and their ends are conventionally affixed to the upper ends 150 of the vertical frame members 104. The backrest 110 is then positioned in front of the support belt 114 and the lower apertures 136 of the brace members 12 are aligned with the lowest screw holes on the lower portions 108 of the vertical frame 104. Then the cushion means 116 is slid over the backrest 10 and more particularly by sliding the rear pocket means 158 over the backrest 110 so that the two set of pockets 160 and 162 are disposed over the front portion 118 of the backrest 110. Then the first and second sets of pads, 160 and 162, respectively, are inserted through the upper openings 154 of the two sets of pockets 160 and 162. These pads can be added or removed from their pockets so that the backrest system 100 can be adjusted to meet the particular alignment needs of each user. Various different sized pads can be utilized to provide the required alignment, including pads having different lengths, depths and/or firmness. Finally, the desired degree of tilt for the backrest can be achieved by adjusting the support belt 114 by moving its buckle 115 laterally; up to 20 degrees of the tilt is provided and available.

Figure 10:
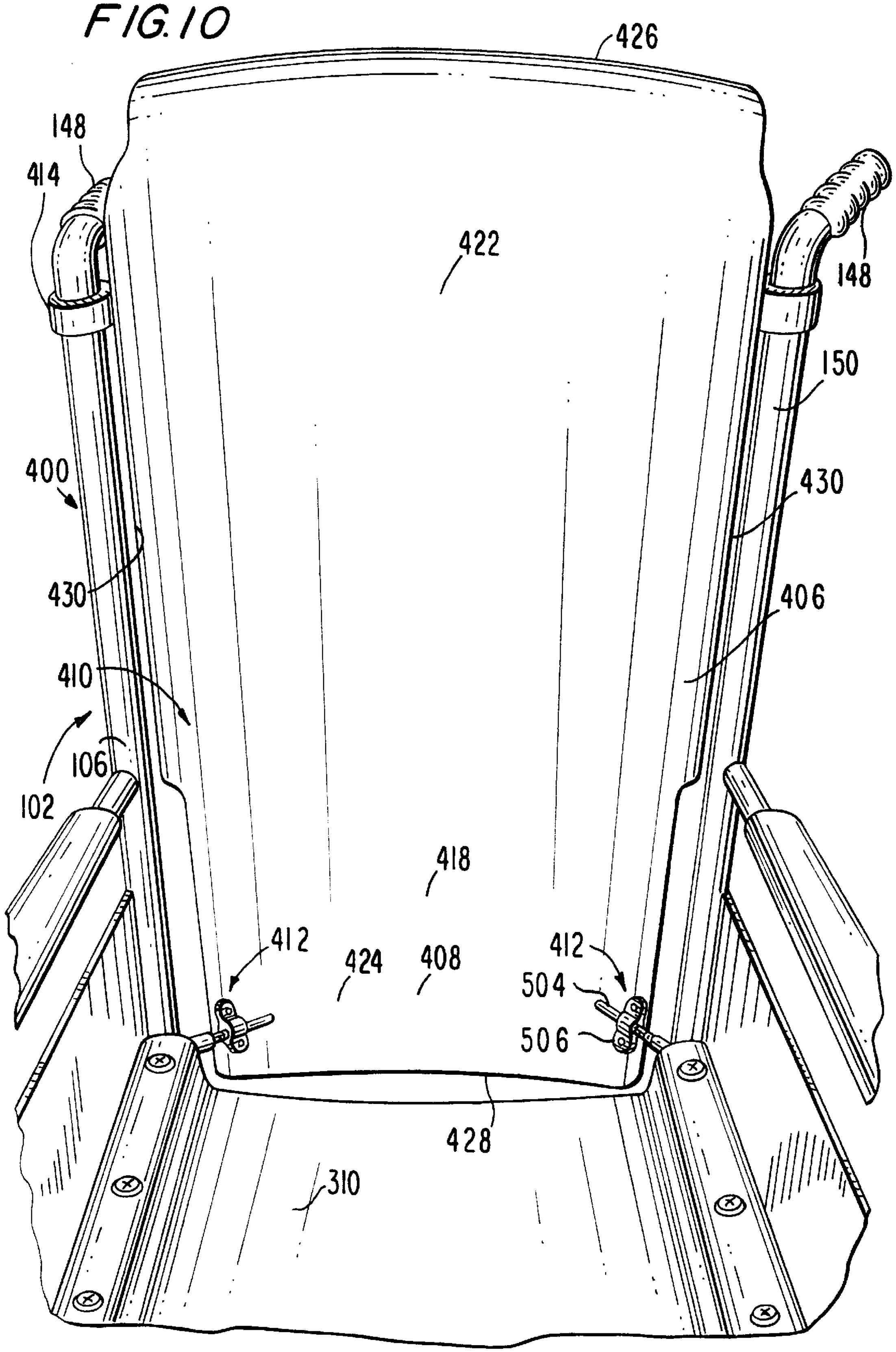
FIG. 10 is a simplified front perspective view of the preferred embodiment of the reclining system of the present invention in place in a wheelchair.
Figure 11:
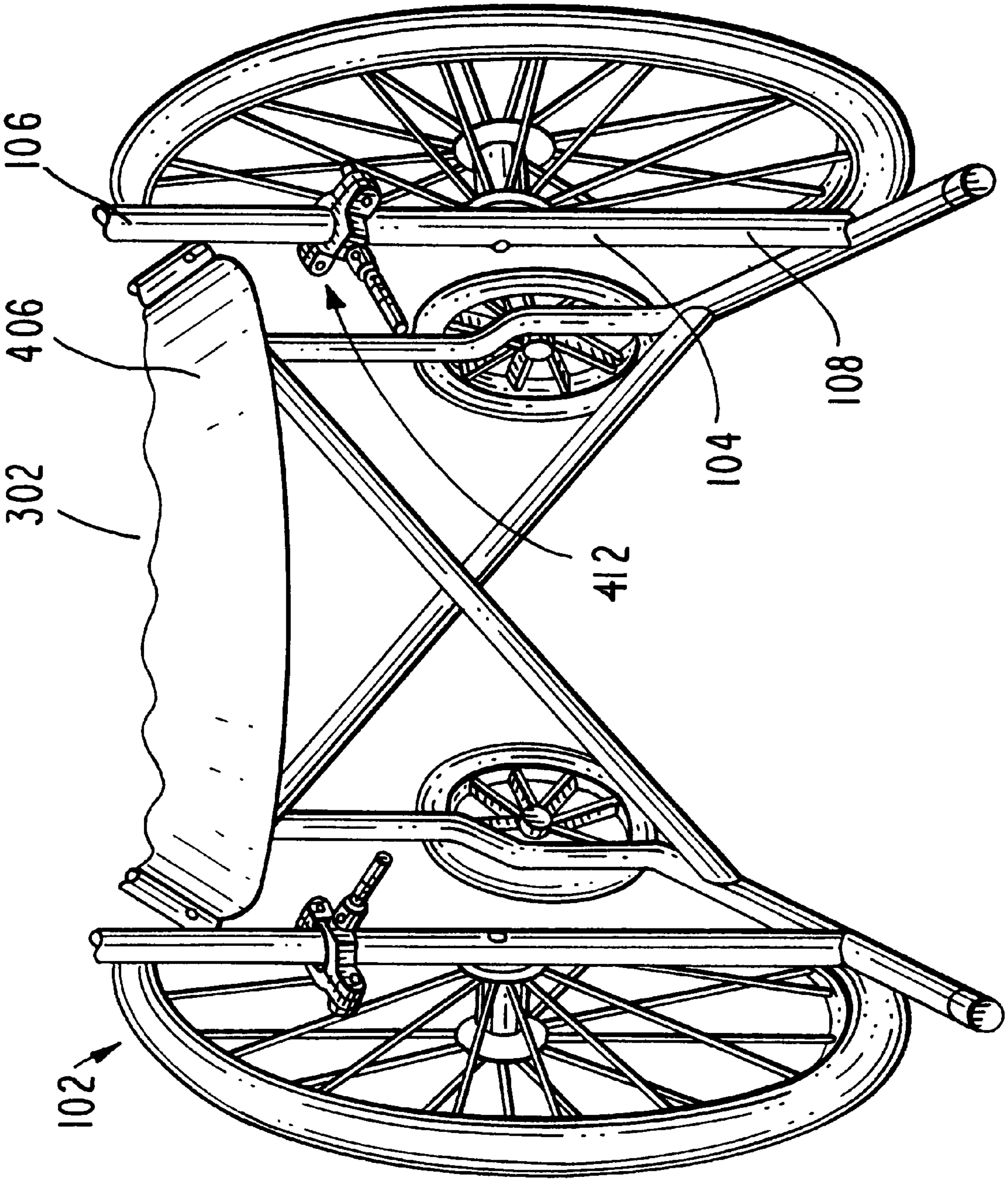
FIG. 11 is a simplified rear perspective view of a portion of the hinge mechanism of the reclining system of FIG. 10.
Figure 12:
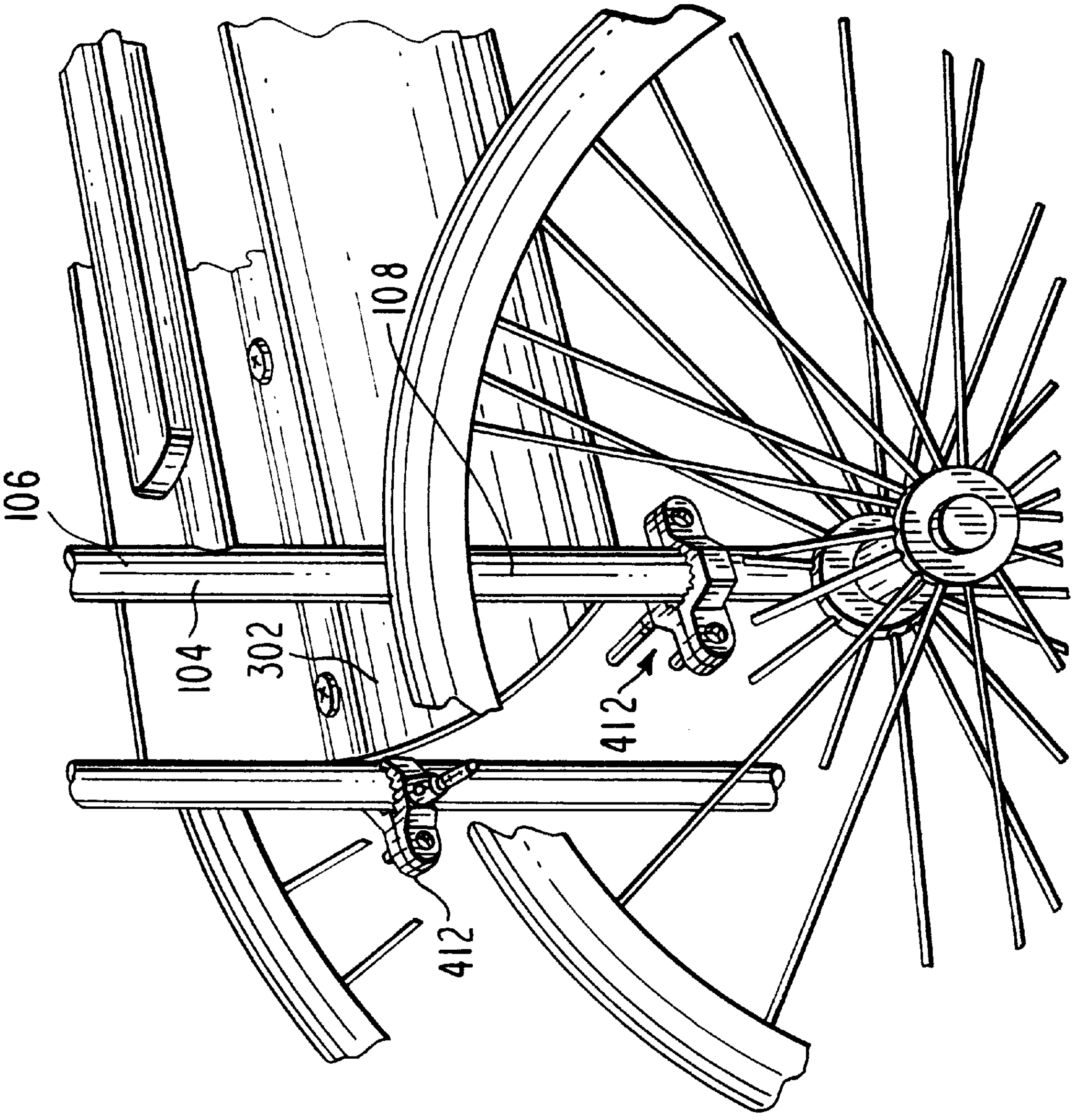
FIG. 12 is a simplified side perspective view of a portion of the hinge mechanism of the reclining system of FIG. 10.
Figure 13:
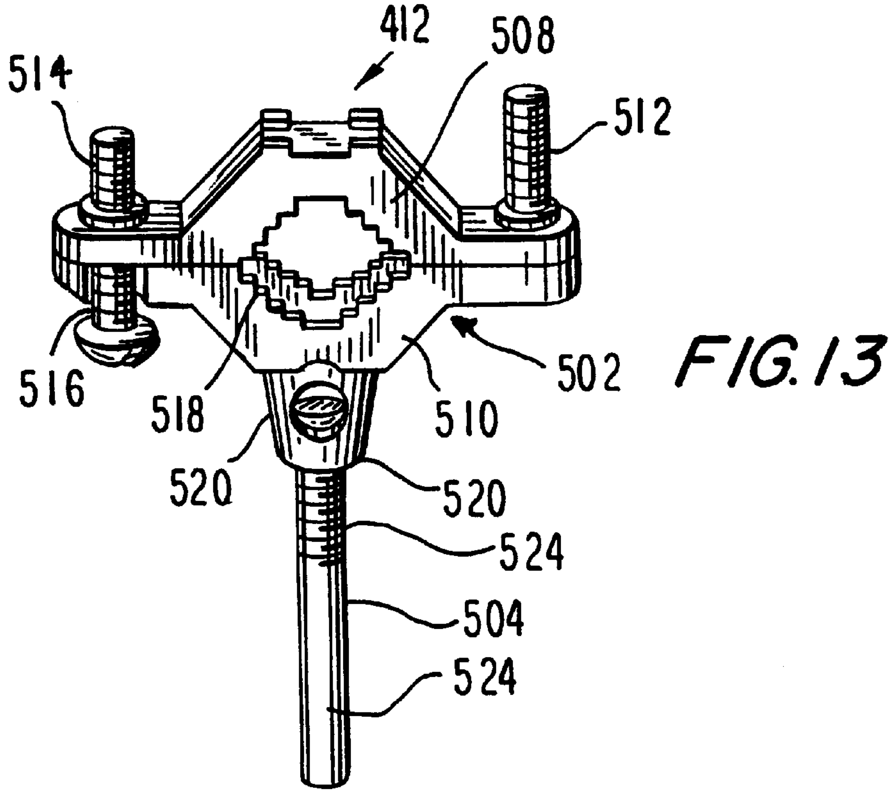
FIG. 13 is a detailed side perspective view of a portion of the hinge mechanism of the reclining system of FIG. 10.
Figure 14:
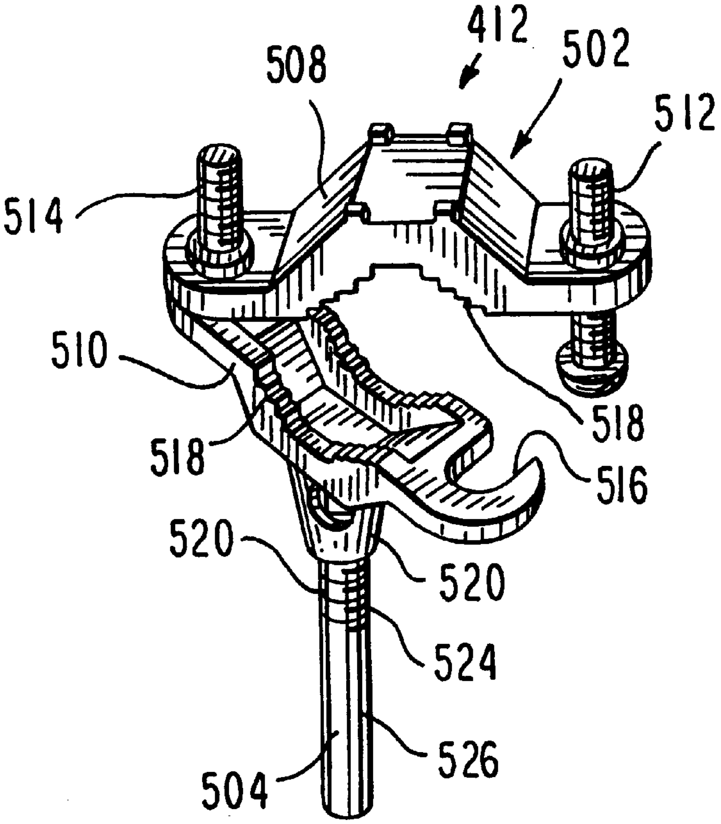
FIG. 14 is a detailed side perspective view of the portion of the hinge mechanism in a partially open position of FIG. 13.

The improved reclining system for a person in a wheelchair is generally referred to by reference numeral 400. Referring to FIGS. 10 through 17, the wheelchair in which such system is utilized is referred to by reference numeral 102; it comprises a pair of conventional vertical frame members 104 having upper and lower portions, 106 and 108, conventional vertical frame members 104 having upper and lower portions, 106 and 108, respectively. The preferred embodiment of the reclining system 400 essentially comprises a substantially rigid backrest 410 (FIG. 10) a hinge means or mechanism 112 (FIG. 13 and 14) an adjustable support belt 414 having a buckle (not shown) and a cushion means (not shown) providing a cushioned vertical backrest. The backrest 410 is generally rectangular shaped, as shown in FIG. 10, and has front and back portions, 418 and 420, respectively. It also has upper and lower portions, 422 and 424, respectively, upper and lower lateral edges, 426 and 428, respectively, and a pair of longitudinal edges 430. The rigid backrest 410 is preferably made of a molded plastic frame such as expanded PVC and its length and width is preferably 28½ inches by 18½ inches.

Referring now to the preferred embodiment of the hinge means or mechanism 412 (FIGS. 13 and 14) such embodiment comprises essentially three elements; a conventional clamping means 502, a pin or rod means 504, and a conventional, generally “U” shaped hinging bracket 506.

The clamping means 502 comprise two generally “C” shaped clamping elements, 508 and 510 connected together at their ends by conventional bolts 512 and 514. One of the clamping elements 510 has a slot 516 which permits clamping means 502 to be detached from the element to which it is clamped, namely the lower portion 108 of the vertical frame 104, and preferably three to four inches below the seat 120. The opposed teeth portions 518 engage the other surface of the frame 104. Integrally formed on the outer side of one of the clamping elements 510 is a truncated conical shaped portion 520 having a threaded aperture 522 axially located therein which permits a pin 504 having a threaded section 524 which threadingly engages the conical portion 510 through its threaded aperture 522. The hinging bracket 506, when affixed to the lower portion 408 of the front portion 418 of the backrest 410 by conventional means (i.e. screws) at its ends, positions the non-threaded end portion 528 of the pin 504 between it and the backrest 410 to permit it to pivot therebetween.

Figure 15:
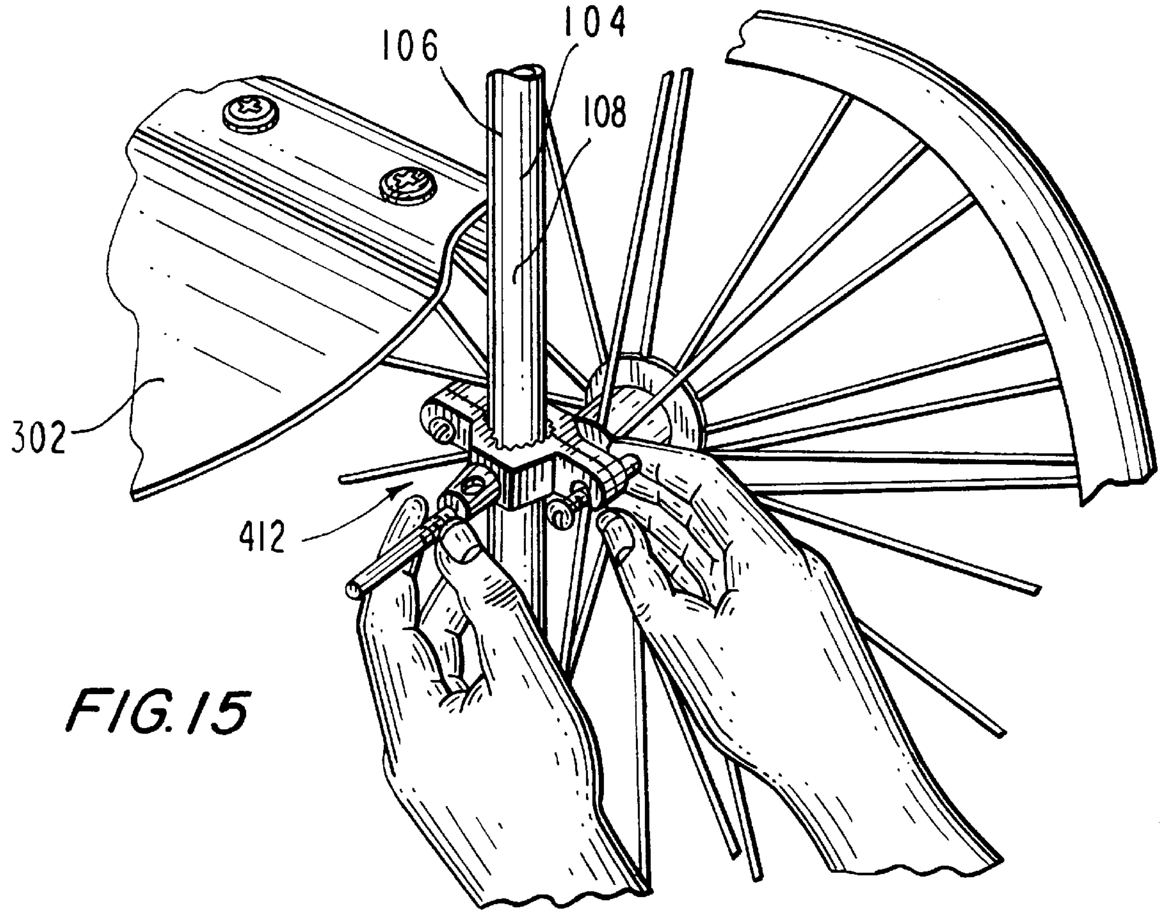
FIG. 15 is a simplified side perspective view of a portion of the hinge mechanism being installed on a frame member of a wheelchair.
Figure 18:
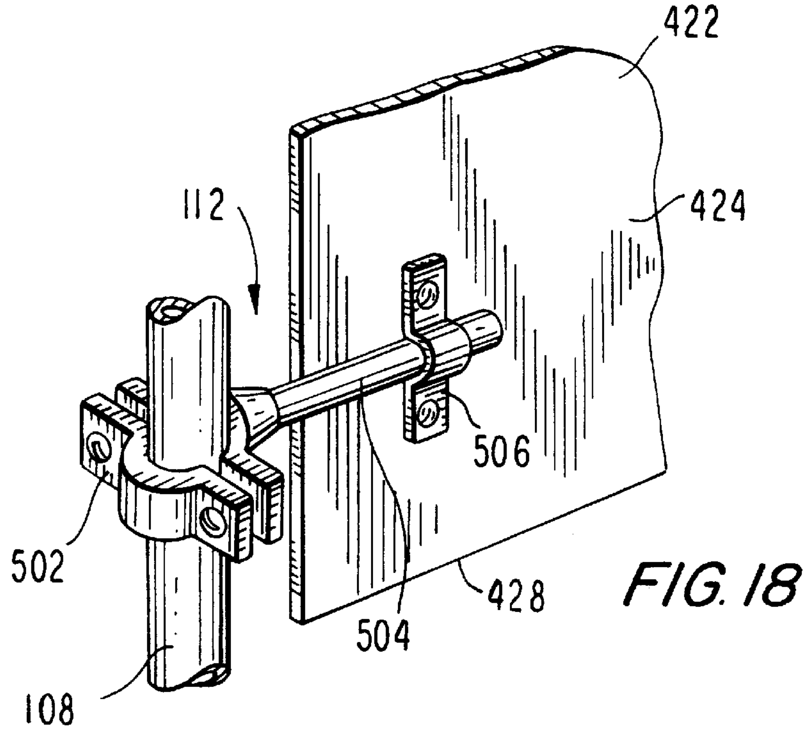
FIG. 18 is an enlarged fragmentary and perspective view of one of the hinge mechanisms attached to a portion of the backrest of the reclining system of FIG. 10.
Figure 16:
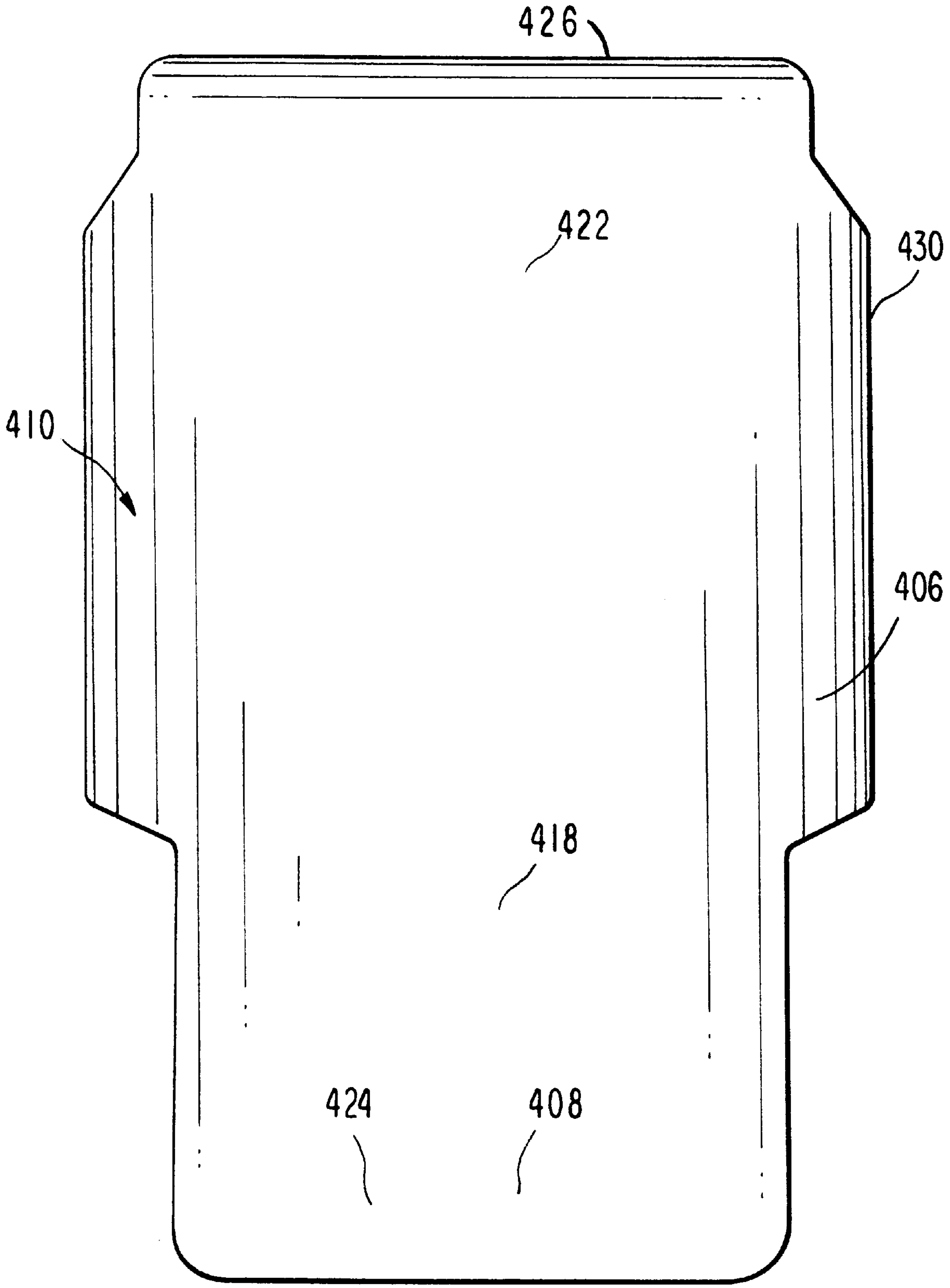
FIG. 16 is a front plan view of the backrest of the reclining system of FIG. 10.

To install the reclining system or kit 400, the existing backrest is removed as described previously and the adjustable support belt 414 (which is identical to the support belt 114 utilized in the first embodiment described) is looped over the push handles 148 and their ends are conventionally affixed to the upper ends 150 of the vertical frame members 104. Then the hinge mechanism 412 is attached to the lower portions 108 of the frame members 104, at a point about three to four inches below the seat 302. This is easily accomplished by opening the clamping means 502 and disposing it around the frame member 104, as best seen in FIG. 15 and then tightening its bolts 514 and 512; the pin 504 can then be connected to the clamping means 502 by inserting its threaded end 524 into the aperture 520 of its conical portion 520 until the desired length of pin 504 is obtained. The length is dependent upon the position of the hinging bracket 506, which as best shown in FIG. 10 is disposed at the lower position 408 of the reclining back 410 and close to its lower longitudinal edges 430 so as to permit each of the two pins 504 to engage and pivot against the inner curved portions thereof so that the reclining back is able to pivot backwards.

The preferred embodiment of the invention as illustrated in FIGS. 10 through 17 includes the following advantages:

1. the reline angle can easily be reclined to any angle beyond thirty degrees, the latter angle of which is approximately the greatest angle of recline of the original embodiment utilizing the brace means;
2. the independent mounting does not depend upon or require the use of existing holes in the frame members of the wheelchair;
3. a truer hinge action or pivot point is established which is mechanically superior to the spring lever type of spring bending design of the brace means embodiment;
4. the height of the reclining back can be easily adjusted up or down along the frame members;
5. the reclining back can be removed and reinstalled as many times as desired without causing any damage or wear to the wheelchair frame; and
6. the newer embodiment obviates any wear and tear to the existing holes in the wheelchair frame compared to the brace means embodiment. Such frame holes can usually withstand only limited repeated use as such frames utilize relatively thin sheet metal tubes.

Figure 17A:
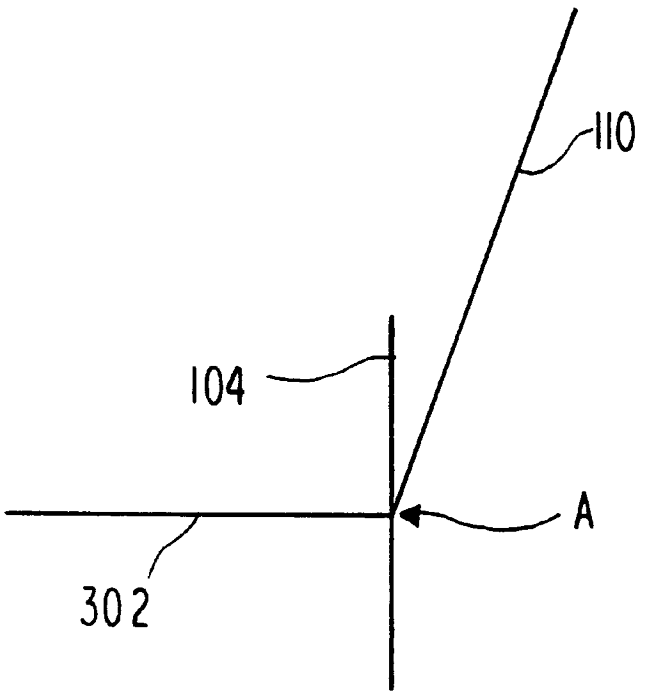
FIG. 17A is a schematic view of the relationship of the seat, frame and reclining backrest and its first pivoting line of intersection "A" of the first embodiment of the invention of FIG. 1.
Figure 17B:
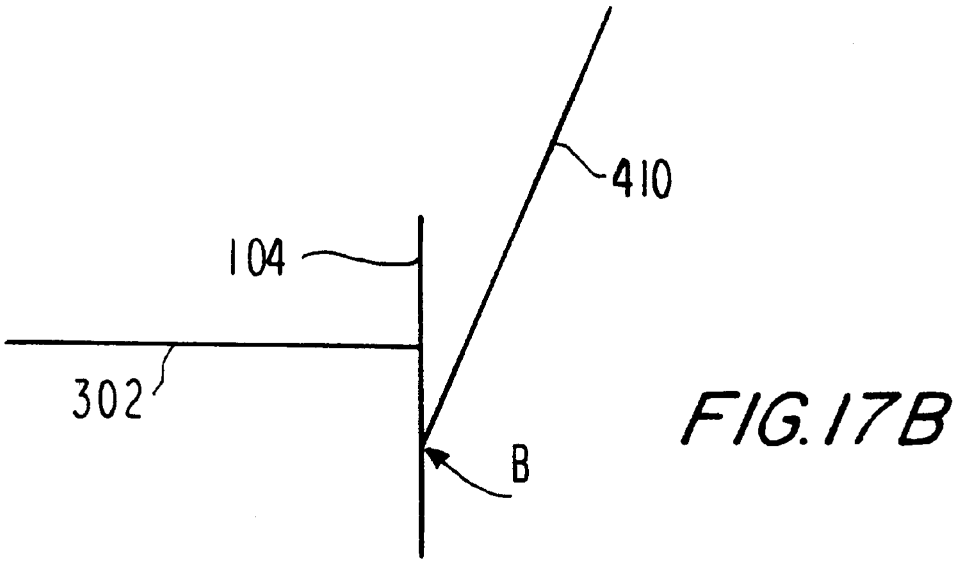
FIG. 17B is a schematic view of the relationship of the seat, frame and reclining backrest and its "second" pivoting line of intersection "B" of the preferred embodiment of the invention of FIG. 10.

In order to appreciate the differences in operation between both embodiments, reference is made to FIGS. 17 wherein the original embodiment utilizing the metal brace members is shown having a first pivoting line of intersection “A” transverse to the plane of the drawing in FIG. 17A wherein the preferred embodiment utilizing the hinge mechanism is shown having a “second” pivoting line of intersection “B” transverse to the plane of the drawing of FIG. 17B and below the plane of the seat 302.

The adjustable support belt 414 (FIG. 10) is disposed below the push handles 148 of the wheelchair 102 and conventionally affixed to each end to the upper end 150 of the upper portions 106 of the vertical frame While the preferred and alternative embodiments of the invention have been illustrated and described, it will be understood by those skilled in the art that changes and modifications may be resorted to without departing from the spirit and scope of the invention.

What is claimed:

1. A reclining backrest system for a person in a wheelchair having a seat and frame which includes a pair of substantially vertical frame members, said seat and vertical frame members each forming a plane, the plane of said seat and the plane formed by said vertical frame members intersecting at a first pivoting line of intersection, comprising:

a substantially rigid backrest having longitudinal and lateral edges, said lateral edges including a lower edge; and a hinge means, adapted to be affixed to said backrest and said vertical frame members in the vicinity of said first pivoting line of intersection, for providing a means to pivotable attach said backrest to said vertical frame members.

2. A reclining backrest system as recited in claim 1, wherein said hinge means is affixed to said backrest distal from said first pivoting line of intersection and at a second pivoting line of intersection defined by the intersection of the planes of said frame members and said backrest.

3. A reclining backrest system as recited in claim 2, wherein said hinge means is disposed below said first pivoting line of intersection.

4. A reclining backrest system as recited in claim 2, wherein said backrest is adapted to extend longitudinally below said seat.

5. A reclining backrest as recited in claim 4, wherein said hinge means is adapted to be affixed to said backrest in vicinity of its lateral edges.

6. A reclining backrest system as recited in claim 2, wherein said hinge means comprises rigid material(s).

7. A reclining backrest system as recited in claim 2, wherein said hinge means comprises:

a) clamping means, affixed to said frame means at said second pivoting line of intersection;

b) bracket means, connected to said backrest at said second pivoting line of intersection; and c) pin means, connected to said clamping means and said bracket means to permit said backrest to pivot around said second pivoting line of intersection.

8. A reclining backrest system as recited in claim 7, wherein said pin means comprises a threaded portion which is connected to said clamping means.

9. A kit for converting a non-reclining wheelchair having two side frames a seat portion, and a back support portion having longitudinal and lateral edges and lateral edges including a lower edge, into a reclining wheelchair, said seat and vertical frame members each forming a plane, the plane of said seat and the plane formed by said vertical frame members intersecting at a first pivoting line of intersection comprising:

a) reclining chair back portion; and b) hinge means, adapted to be to said chair back portion and said two side frames for providing a means to pivotable attach said reclining chair back portion to said wheelchair.

10. A kit for converting a non-reclining wheelchair as recited in claim 9, further comprising adjustable support means, adapted to be connected to said two side frames, for adjusting the desired degree of recline of the chair back portion and for supporting said chair back portion.

11. A kit for converting a non-reclining wheelchair as recited in claim 9, the planes of said seat and the plane formed by said two side frames intersecting at a first pivoting line of intersection, and wherein said hinge means is affixed to said chair back support portion in the vicinity of the lower edge of its lateral edges.

12. A kit for converting a non-reclining wheelchair as recited in claim 9, said hinge means is disposed on said first pivoting line of intersection.

13. A kit for converting a non-reclining wheelchair as recited in claim 9, wherein said hinge means is affixed to said back support portion distal from said first pivoting line of intersection and affixed at a second pivoting line of intersection defined by the intersection of the planes of said frame members and said back support portion.

14. A kit for converting a non-reclining wheelchair as recited in claim 13, wherein said hinge means is adapted to be affixed at a point below said seat.

15. A reclining backrest system as recited in claim 1, wherein said hinge means permits continuous angular adjustment of said backrest.

16. A reclining backrest system as recited in claim 15, wherein continuous angular adjustment of said backrest is permitted without requiring any adjustment of the upper backrest support means.

17. A reclining backrest system as recited in claim 1, wherein said hinge means has a single fixed pivot point.

* * * * *